(12) United States Patent
Purdy

(10) Patent No.: US 9,017,628 B2
(45) Date of Patent: Apr. 28, 2015

(54) SONOCHEMICAL SYNTHESIS OF BORON AND BORON-CARBON NANOMATERIALS BY ALKALI METAL REDUCTION

(71) Applicant: Andrew P. Purdy, Alexandria, VA (US)

(72) Inventor: Andrew P. Purdy, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 46 days.

(21) Appl. No.: 14/089,217

(22) Filed: Nov. 25, 2013

(65) Prior Publication Data

US 2014/0147364 A1    May 29, 2014

Related U.S. Application Data

(60) Provisional application No. 61/729,679, filed on Nov. 26, 2012.

(51) Int. Cl.
*C01B 35/04* (2006.01)
*C01B 35/02* (2006.01)

(52) U.S. Cl.
CPC ............... *C01B 35/04* (2013.01); *C01B 35/023* (2013.01); *C01P 2006/12* (2013.01)

(58) Field of Classification Search
CPC ..... C01B 35/02; C01B 35/023; C01B 35/026; C01B 35/04; C01B 35/06; C01B 35/061
See application file for complete search history.

(56) References Cited

U.S. PATENT DOCUMENTS

| 4,606,902 A  * | 8/1986 | Ritter ........................... 423/345 |
| 2011/0070426 A1 * | 3/2011 | Vanier et al. ................. 428/325 |

OTHER PUBLICATIONS

Baranchikov et al. (Sonochemical Synthesis of Inorganic Materials; Russian Chemical Reviews; 76(2), pp. 133-151; 2007).*

* cited by examiner

*Primary Examiner* — Guinever Gregorio
(74) *Attorney, Agent, or Firm* — US Navy Research Laboratory; Roy Roberts

(57) ABSTRACT

A method of preparing a nanomaterial comprising boron includes sonicating a boron trihalide and/or boron alkoxide in a hydrocarbon solvent with an alkali metal under an inert atmosphere to form a dark solid, and annealing the dark solid at a temperature sufficient to sublime alkali metal salt therein, thereby obtaining a boron nanomaterial. Reacting with a Group IVB metal produces a metal boride, and combining an alkali metal salt of a hydrocarbon with the boron trihalide prior to sonicating produces a carbonaceous boron material.

9 Claims, 1 Drawing Sheet

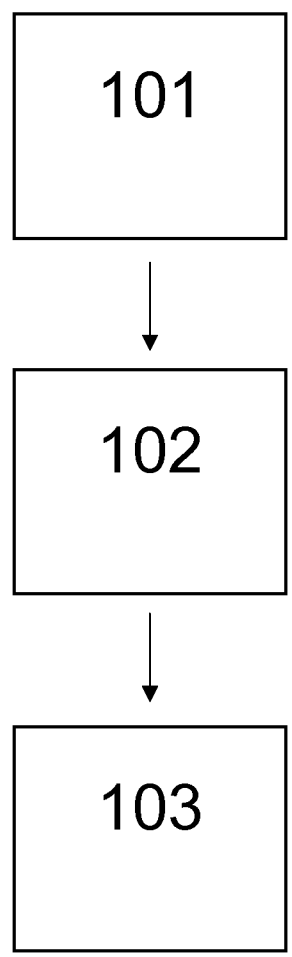

SONOCHEMICAL SYNTHESIS OF BORON AND BORON-CARBON NANOMATERIALS BY ALKALI METAL REDUCTION

BACKGROUND

Reduction of boron oxides or halides with active metals such as the alkalis, alkaline earths, or aluminum is known in the art. A need exists for techniques for the synthesis of very high surface area boron nanomaterials.

BRIEF SUMMARY

In one embodiment, a method of preparing a nanomaterial comprising boron includes sonicating a boron trihalide and/or boron alkoxide in a hydrocarbon solvent with an alkali metal under an inert atmosphere to form a dark solid, and annealing the dark solid at a temperature sufficient to sublime alkali metal salt therein, thereby obtaining a boron nanomaterial.

BRIEF DESCRIPTION OF THE DRAWING

FIG. 1 schematically illustrates an exemplary process for preparing a nanomaterial comprising boron.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Description

Techniques described herein allows the synthesis of very high surface area boron nanomaterials, and allows the isolation of the product from the byproduct salts without exposure to air or water.

As seen schematically in FIG. 1, an exemplary method involves combining 101 a boron trihalide and/or boron alkoxide in a hydrocarbon solvent with an alkali metal and sonicating under an inert atmosphere (for example, under nitrogen gas). This forms a dark solid 102 which includes alkali metal salt and the desired boron nonmaterial The dark solid 102 is then annealed at a temperature sufficient to sublime alkali metal salt therein, ideally under a vacuum, thereby obtaining a boron nanomaterial 103.

Sonication techniques are known in the art and are detailed in, for example, "Sonochemistry' by T. J. Mason, Oxford Univ. Press 1999 and "Theoretical and Experimental Sonochemistry Involving Inorganic Systems" by M. P. Pankaj, Springer 2010, each of which is incorporated herein by reference.

Preferably, the boron nanomaterial has a surface area of at least 300 $m^2/g$, more preferably at least 400 $m^2/g$, still more preferably at least 500 $m^2/g$. The high surface area boron nanomaterials tend to be extremely reactive and ignite in oxygen at low temperatures (400° C. or less), and the highest surface area material produced in the Examples (having a BET surface area of 535 $m^2/g$) spontaneously ignites in air at room temperature. Upon combustion, the consumption of boron is complete or nearly complete, thus correcting a well-known deficiency in the behavior of micron scale boron in energetic formulations, namely the lack of complete energy release due to passivation of the fuel by liquid boron oxide.

Metal borohydrides can be reduced with Na/K and produce metal borides, at least with the Group IVB metals.

Boron trifluoride etherate, $BF3.O(Et)_2$, was found to be reduced with Na/K, but was significantly slower to react than the chlorides.

A boron alkoxides of the formula $B(OR)_3$, namely $B(OCH_2CH_3)_3$ (also termed $B(OEt)_3$), was found to be reduced with lithium powder, but not with Na/K. Advantageously, boron alkoxides are relatively inexpensive compared to boron halides. It is expected that other alkoxides would react similarly.

Co-reduction of $BCl_3$ with Group IVB halides produced metal carbides.

Reaction of alkali metal salts of polyaromatic hydrocarbons (PAH) (for example, made by deprotonation of the PAH with $KNH_2$) with $BCl_3$ prior to reduction produced carbonaceous boron materials.

EXAMPLES

Example 1

In a drybox, a 1 M solution of $BCl_3$ in heptane (64.78 g, 87.4 mmol) was put in a 500 mL Pyrex bulb with 31 g toluene. 7.8 g (268 mmol) Sodium-Potassium alloy (50:50 by wt) was measured out, and about half added to bulb. The bulb was closed and placed in a sonicator outside the drybox. The next day, it was returned to the drybox and the remaining Na/K was added, and then sonicated 5 more days. The black slurry was filtered in a drybox and washed with fresh toluene. The black solids were put in an Inconel sublimator for annealing. Under dynamic vacuum, it was heated at 300° C. for 12 h and 900° C. for 8 h. 0.85 g of a black solid #1X-1 was isolated 0.85 g (90% based on $BCl_3$). An additional 0.0265 g of a black powder was isolated by washing the material out of the sublimator under an $N_2$ atmosphere, filtering, washing with water (in air), rewashing with alcohol, and pumping dry. Results of a series of similar reactions is listed in Table 1

TABLE 1

Alkali reductions of $BCl_3$

| Rxn no. | $BCl_3$* (mmol) | Alkali metal (g) | Extra Solvent | Sonication | Final Anneal | Annealed Product | BET area ($m^2/g$) |
|---|---|---|---|---|---|---|---|
| 1X-1A | 87.4 | Na/K 7.8 g (2 addns) | PhMe | 6 d | 900° C., 8 h | 0.85 g | 535 |
| 8X-1 | 38.06 | $NaK_2$ (3.85 g) | PhMe | 6 d | 27% at 910° 19 h | 0.130 g | 289 |
| 2X-1 | 22.4 | Li powder (0.466) | | 5 d | 870-900 6 h | 0.243 g | 63 |
| 68W-2 | 10.0 | Na/K (1 g) | PhMe | 4 d | 34% at 860°, 6 h | 0.0375 g | 374 |
| 68W-2A | As above | As above | As above | As above | 48% at 990, 2 h | 0.0603 g | 344 |
| 68W-1A | 10.0 | Na/K (1 g) | | 5 d | 91% at 900° C., 7 h | 0.0983 g | 297 |
| 87W-1 | 32.06 | Na/K (3.5 g, 2 addns) | | 8 d | 870-945° C., 36 h | 0.350 g | 250 |

*Solution in $C_7H_{16}$

Example 2

Boron trifluoride etherate (2.68 g) was dissolved in 25 mL dry ether in a bulb with a Kontes valve. A 0.4 g portion of Na/K added and sonicated overnight which produced a small amount of reaction. The remainder of 1.71 g Na/K added and the bulb sonicated for 2 weeks, and then the contents were filtered in the drybox and washed with more dry ether. The solids were heated in a quartz sublimator under vacuum and additional reaction took place at 235° C. producing voluminous black solids. Additional heat to 450° C. produced a small amount of white sublimate, and 2.36 g brown solid was isolated. An attempt to sublime the fluoride salts out of the product under vacuum from a 1.03 g portion at 960° C. under vacuum left 0.39 g of brown solid. Both portions were washed with water under oxygen-free conditions, and then rinsed with alcohol and pumped dry. The 450° C. heated portion afforded 0.0973 g brown powder and the 960° C. portion afforded 0.0406 g brown powder. A solid state B-11 NMR of the latter showed one peak coincident with elemental boron.

Example 3

(A) An initial attempt to reduce $B(OEt)_3$ with Na/K produced no reaction. In a closed bulb, 2.00 g B(OEt)3, 0.15 g Li powder, and 10 mL $Et_2O$ were sonicated for 2 days and filtered in dry box yielding 2.60 g of a reactive solid. A 0.75 g portion was heated in stages under vacuum—4 h up to 315° C., overnight at 450° C. and at 565° C. for 3 h. Produced large amounts of a sublimate and 38 mg of amorphous black solid that has the solid state NMR peak resembling elemental boron, and contained Li+ ion. (B) 2.55 mL of $Si(OEt)_4$, 15 mL ether, and s 1.00 g Na/K was sonicated for 2 days and had no reaction. The Na/K was removed and replaced with 0.25 g Li powder. After 2 days sonication a highly pyrophoric black solid was produced. (C) A mixture of $B(OEt)_3$, $Si(OEt)_4$, and $Ta(OEt)_5$ was reduced with Li powder in a similar manner. Powder x-ray diffraction showed evidence for tantalum borides.

Example 4

(A) A 6:1 ratio of decacyclene and potassium amide was prepared in a glove box. Decacyclene (0.1021 g, 2.266 mmol) and potassium amide (0.0749 g, 1.359 mmol) were added to a flask followed by the addition of ethylene diamine (En, 2 mL). The solution turned a dark royal blue. The solution was concentrated back to a dark black/blue solid under vacuum followed by vacuum at 120° C. Toluene (10 mL) was added and the flask was sonicated to loosen the solid from the walls. Boron trichloride added (1.5 mL, 1.0M, 0.0015 mol) was added via syringe to make a dark green solution. More toluene was added (10 mL), and the solution sonicated for several days to yield a yellow solution that fluoresced green when exposed to white light. Na/K (5 drops more than 0.145 g) in excess of 3:1 with the boron trichloride was added via pipette and returned to the sonicator. After 12 hours and the solution lost the green tint and a solid grey precipitate of fine grain was visible. The solution was sonicated for 1 week then filtered in a fine frit and pyrolyzed in a steel tube at 430 for 18 hours, 615 for 3 hours, and 715 for 15 hours. A black porous solid with mass of 0.1078 g (93.39% yield) was recovered. MAS $^{11}B$ NMR showed a peak matching the chemical shift for elemental boron and another peak. The BET surface area was 854 $m^2/g$. (B) similar reactions were done with anthracene (1:2:2 PAH:$KNH_2$:$BCl_3$), pyrene (1:4:4 PAH:$KNH_2$:$BCl_3$), napthalene (1:1:1 PAH:$KNH_2$:$BCl_3$), and lithium acetylide (3:1 LiCCH:$BCl_3$), and pyrolyzed in a similar manner to make boron-carbon materials, with results listed in Table 2 (including two different experiments with decacyclene).

TABLE 2

Reactions with hydrocarbons

| | Ratio of $KNH_2$:hydrocarbon used | color of solution | Pyrolysis Temperature ° C. | BET surface area ($m^2/g$) |
|---|---|---|---|---|
| decacyclene | 6:1 | royal blue | 775 | 853.96 |
| anthracene 2:1 | 2:1 | turquoise/green | 714 | 643.67 |
| pyrene | 4:1 | red-pink | 830 | 928.74 |
| napthalene | 1:1 | hunter green | 772 | 112.52 |
| acetylene | 1:0.3* | — | 900 | 174.07 |
| decacyclene 2 | 6:1 | royal blue | 842 | 892.78 |

*no $KNH_2$ used, this is the approximate ratio of acetylene:Boron

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

What is claimed is:

1. A method of preparing a nanomaterial comprising boron, the method comprising:
   sonicating a boron alkoxide in a hydrocarbon solvent with an alkali metal under an inert atmosphere to form a dark solid comprising an alkali metal salt, and
   annealing the dark solid at a temperature sufficient to sublime alkali metal salt therein, thereby obtaining a boron nanomaterial.

2. The method of claim 1, wherein the annealing is conducted at a pressure of less than one atmosphere.

3. The method of claim 1, wherein the alkali metal is selected from the group consisting of sodium, potassium, lithium, and combinations thereof.

4. The method of claim 1, wherein the hydrocarbon solvent is selected from the group consisting of hexane, heptane, toluene, and combinations thereof.

5. The method of claim 1, wherein the alkali metal is lithium.

6. The method of claim 5, wherein the boron alkoxide is $B(OEt)_3$.

7. The method of claim 1, wherein the boron nanomaterial has a surface area of at least 300 $m^2/g$.

8. The method of claim 1, further comprising reacting with a Group IVB metal to produce a metal boride.

9. A method of preparing a nanomaterial comprising boron, the method comprising:
   sonicating $B(OEt)_3$ in a hydrocarbon solvent with lithium powder under an inert atmosphere to form a dark solid comprising an alkali metal salt, and
   annealing the dark solid at a temperature sufficient to sublime alkali metal salt therein, thereby obtaining a boron nanomaterial.

* * * * *